N. E. BURWELL.
CAR FENDER.
APPLICATION FILED OCT. 17, 1910.

1,011,406.

Patented Dec. 12, 1911.

Witnesses:

Nicholas E. Burwell
Inventor
Attorneys

UNITED STATES PATENT OFFICE.

NICHOLAS E. BURWELL, OF HACKENSACK, NEW JERSEY.

CAR-FENDER.

1,011,406.  Specification of Letters Patent.  Patented Dec. 12, 1911.

Application filed October 17, 1910. Serial No. 587,535.

*To all whom it may concern:*

Be it known that I, NICHOLAS E. BURWELL, a citizen of the United States, and a resident of Hackensack, New Jersey, have invented a new and useful Improvement in Car-Fenders, which invention is fully set forth in the following specification.

My invention is an improved fender intended primarily for use with a street car, but it can be used to advantage with any power-driven vehicle or conveyance.

The object of the invention is to produce a fender which will remove, or at least minimize, the chance of serious accident by preventing the car from running into a person or other object in its path,—and at the same time to produce a fender which is readily attached to or detached from a car, and may be shifted from one end of the car to the other, or to another car.

The invention consists broadly of a unitary frame with means for securing it detachably to the car so as to constitute a self-containing and complete device that may be attached to or removed from the car by one operation.

The invention comprises the provision of an apron and a scoop so constructed and arranged that normally the scoop extends close to the track or roadway in position to pick up (rather than to run over or throw aside) the person or object struck and land the same upon the apron, whereupon the apron and scoop adjust themselves into a cradle which prevents the person or object from rolling or sliding off the fender.

The invention further consists of the details of construction and arrangement hereinafter set forth and claimed.

Figure 1:
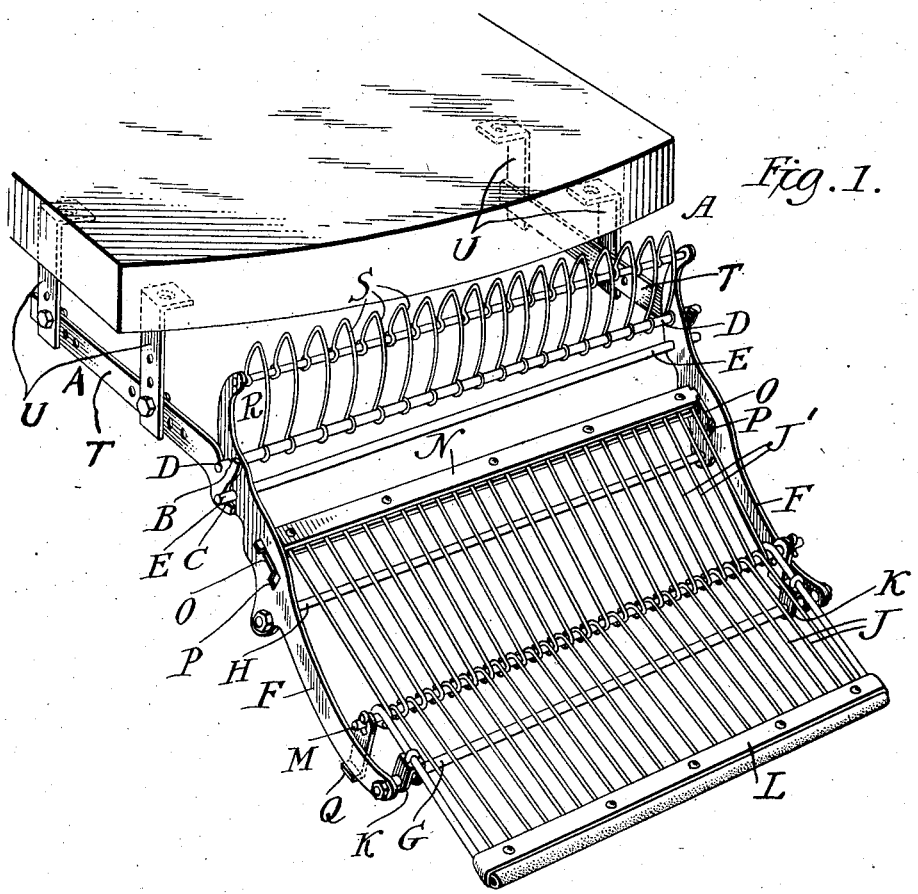
Figure 2:
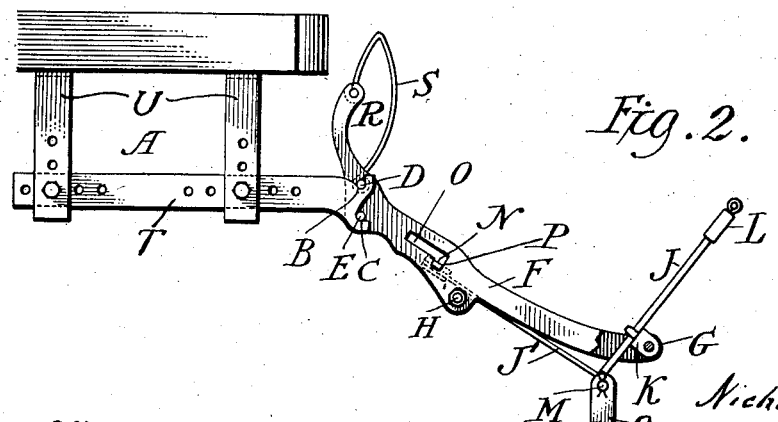

The invention will be best understood by reference to the accompanying drawings, in which:

Figure 1 is a perspective view of my fender, attached to the front portion of a car, and in its normal position; and Fig. 2 is a side elevation, showing the parts in the position of the cradle, assumed when the object has been scooped up from the roadway.

A—A represent two supporting-brackets as a whole, one on either side of the lower front end of the car. Each bracket comprises two vertical members U—U, and a horizontal member T; the former depending securely from the floor of the car and each provided with a vertically-disposed series of bolt-holes, and the latter provided with the horizontal series of bolt-holes, and also having at its forward end the seats B and C. By means of these bolt-holes, the position of said seats is adjustable vertically and horizontally.

The detachable fender comprises a rigid frame carrying the apron and the scoop aforesaid; with a buffer for the latter, and preferably provided with a rear buffer as well. This frame consists of the two side-bars F—F, rigidly united by the transverse front-bar G and a transverse rear-bar, and provided with the two intermediate transverse-bars D and E, and if desired with one or more additional transverse-bars, as H, to add strength and rigidity. Two studs or projections on each side, preferably the prolongation of the two bars D and E, support the frame by engaging respectively in the seats B and C; and near the rear of each side-bar is a slot O.

The scoop is a frame, preferably consisting of parallel steel strips J, pivoted about midway of its length upon the transverse front-bar G, which serves as the axis for the scoop; so that the forward ends of the strips project beyond the axis, being united at their extreme front by the transverse bar and buffer L.

The apron consists preferably of similar parallel steel strips J'. At their rear ends these strips J' are connected by the transverse bar N, whose ends project. The front ends of these strips J' of the apron are pivoted to the rear end of the corresponding strips J of the scoop, as by the transverse rod M,—the latter thus constituting a floating pivot or hinge. The ends of the bar N are seated in the guide-slots O, in the side-bars F of the frame,—the bar N thus acting as a slide-bar. These guide-slots O are located near the rear of the side-bars F, and extend forwardly and downwardly, terminating in the locking-seats P—P.

Preferably the scoop is pivoted upon bar G by means of two ears K, one upon each of the outside scoop-strips J, which leave unimpaired the resiliency of the remaining strips J. Preferably the hinge-bar M, which connects the scoop and the apron, is provided with stops Q, adapted to engage beneath side-bars F, to prevent the front of the scoop from dropping down too far. Preferably the fender is provided with the rear buffer R, consisting of a series of steel springs or buffer-members S, arranged vertically and with their ends secured respectively to the transverse rear-bar and to one of the intermediate bars, as D,—the rear portions of the side-bars F preferably extending upwardly so that said transverse rear-bar will present a suitable support for the upper ends of said buffer-members S.

It is obvious that a car can be provided at each end with the adjustable brackets A, and the same can be suitably adjusted; and that the detachable fender as a whole can be readily put in place upon any car thus equipped, by causing the fender-supports (specifically the prolongations of transverse bars D and E) to engage the seats B and C, which installs the complete fender. The fender is as readily disengaged, by merely lifting out the entire apparatus from its engagement with seats B and C.

The operation of the fender will be readily understood.

In the normal position, the scoop depends downwardly, as in Fig. 1, until its front buffer is as close to the track or roadway as may be desired. When a person or other object is struck, the buffer L receives the same; and, since stops Q will not permit the forward end of the scoop to be depressed, the person or other object will be carried backward upon the scoop, and the weight thereof will depress the hinge M. This tilts up the front end of the scoop, as in Fig. 2, the depression of hinge M drawing slide-bar N forward until the projections of the latter enter the locking-seats P at the forward end of the guide-slots O. This locks the apparatus in the position shown in Fig. 2, the up-tilted scoop holding the person or object from falling or sliding to the ground.

I have thus fully described my invention in its various details of construction and arrangement. But I do not limit myself to the precise construction and arrangement of parts herein set forth, since changes may be made without departing from the spirit of my invention.

Having thus described my invention, I claim:

1. In combination, two depending bracket-members secured at each side of the forward end of a car, a horizontal bracket-member vertically and horizontally adjustable on each pair of the first-named bracket-members and having at its front end two supporting-seats, a rectangular frame comprising a transverse front-bar and two side-bars, each of the latter having at its rear a slot terminating at its front in a locking-seat, two projections near the rear of each side-bar adapted to detachably engage the corresponding pair of supporting-seats aforesaid, a scoop pivoted between its front and rear upon said front-bar, an apron hinged at its front to the rear of said scoop, and a transverse bar slidable in said slots and supporting the rear of said apron.

2. In combination, two adjustable brackets carried at the front end of a car, a rigid frame detachably supported upon said brackets and comprising a transverse front-bar and two side-bars rigidly connected thereto, each of the latter having at its rear a guide-slot terminating at its front in a locking-seat, a transverse bar slidable in said slots to enter said locking-seats, an apron supported at its rear by said slide-bar, a scoop carrying a buffer at its projecting forward end, a floating hinge-rod connecting the rear of said scoop and the front of said apron, said scoop being pivoted upon said transverse front bar between said buffer and said hinge-rod.

3. A detachable fender comprising a rigid rectangular frame having two side-bars and also having a transverse front-bar and a transverse rear-bar and transverse intermediate bars all secured to said side-bars, studs carried by said side-bars for supporting said fender, a rear-buffer carried by two of said transverse bars, a scoop pivoted between its front and rear upon said transverse front-bar so as to project in front of the same, and an apron hinged to the rear of said scoop and at its own rear supported slidably upon said frame.

4. A rigid rectangular frame detachably supportable upon a car and comprising a transverse front-bar and two side-bars rigidly secured thereto, each side-bar having a guide-slot terminating in a locking-seat, a scoop pivoted between its front and rear upon said front-bar to project forwardly therefrom, a transverse slide-bar having extensions slidable in said slots to enter said locking seats, and an apron supported at its rear by said slide-bar and hinged at its front to the rear of said scoop.

5. A car-fender comprising a rigid frame detachably supportable upon a car, a scoop pivoted upon the front of said frame and projecting forwardly therefrom, a buffer carried by the front of said scoop and adapted to be tilted upward, an apron hinged to the rear of said scoop and slidably supported at its own rear upon said frame, and locking-means for securely holding said buffer in its up-tilted position.

In testimony whereof I have signed this specification in the presence of two subscribing witnesses.

NICHOLAS E. BURWELL.

Witnesses:
C. A. L. MASSIE,
RALPH L. SCOTT.